March 18, 1958     W. C. RUDD     2,827,543
TUBE WELDING BY HIGH FREQUENCY RESISTANCE HEATING
Filed July 20, 1956
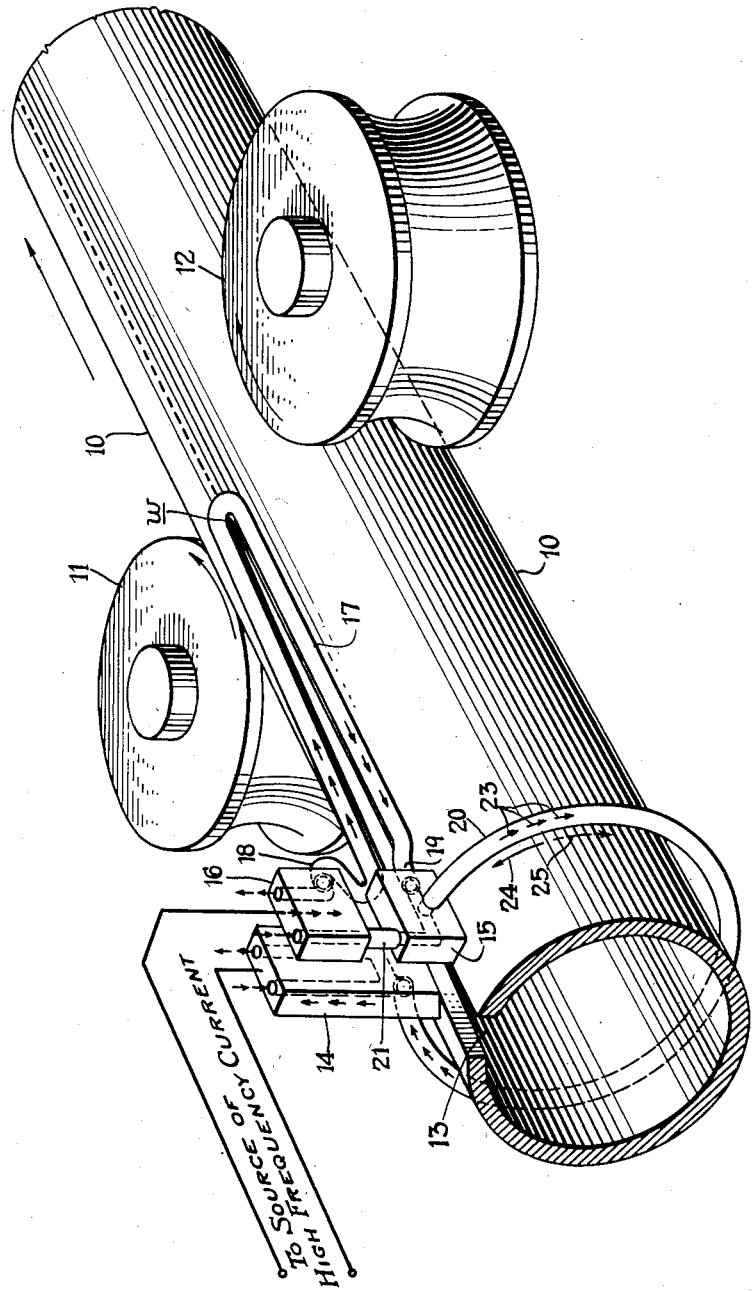
INVENTOR.
WALLACE C. RUDD.
BY
Ward, Neal, Haselton Orme & McElhannon
ATTORNEYS.

2,827,543
TUBE WELDING BY HIGH FREQUENCY RESISTANCE HEATING

Wallace C. Rudd, Larchmont, N. Y., assignor to Magnetic Heating Corp., New Rochelle, N. Y., a corporation of New York Application July 20, 1956, Serial No. 599,094

2 Claims. (Cl. 219—67)

This invention relates to the welding of metal tubing by the use of high frequency resistance heating.

A method has heretofore been known, for example as disclosed in British patent to Magnetic Heating Corporation, No. 748,528, accepted February 23, 1956, for welding together the edges defining a gap in metal tubing, such method comprising advancing the tubing longitudinally while applying pressure thereto to close the gap at a welding point, and heating the gap edges to welding temperature at such point, such heating being effected by the application of radio frequency current by means of contacts which engage the tube metal at points on or near the opposite gap edges and at positions in advance of the welding point. The current used is of such a high frequency that the lowest impedance path between the contacts for the current in the tubing follows along the gap edges to the welding point, whereby the greater part of the current, and hence of the resistance heating effect, is concentrated at the approaching gap edges and the welding point.

While such method operates satisfactorily under many conditions, there is still some substantial tendency, more especially with small tubing, for portions of the heating current to flow circumferentially around the back of the tubing opposite from the gap, thus wastefully heating to some degree portions of the tube metal remote from the gap and where no heating is necessary.

The present invention provides a relatively simple means and method for minimizing such wasted current flow around the back of the tubing and this is accomplished by providing a "coil" of one or more turns, extending circumferentially of the tubing in closely spaced relation to the wall surfaces thereof and so connected to the source of high frequency current that it will cause a voltage to be induced in the tube metal along a path extending circumferentially around the tubing, which voltage at any given instant will be in opposition to the voltage which causes the current to flow from the above-mentioned contacts around circumferentially on the tubing. Thus the impedance of the current path from one contact around the back side of the tubing to the other contact, is increased, and as a consequence, a larger proportion of the work current tends to be concentrated along the approaching gap edges which are to be welded together.

According to the invention herein disclosed, such "coil" or turn extending circumferentially of the tubing, has its terminals connected respectively to the contacts which apply the current to heat the gap edges. In other words, the "coil" or turn is electrically connected in parallel with the portion of the electrical circuit which heats the gap edges. In a co-pending application filed on July 27, 1956, Serial No. 600,606, by the present applicant jointly with Joseph Wesley Cable, such a "coil" for a similar purpose and having one, two or more turns, is disclosed, having its terminals connected in series with the part of the electric circuit which heats the gap edges.

Various further and more specific objects, features and advantages of the invention will appear from the description given below, taken in connection with the accompanying drawings, illustrating by way of example a preferred form of the invention.

In the drawing the sole figure comprises a somewhat schematic perspective view showing a preferred embodiment of the invention.

As shown, a tube 10 is being advanced through a tube mill by and between a pair of pressure rollers of known form as at 11 and 12, which engage the opposite sides of the tube and cause the longitudinal gap 13 therein to become closed substantially at a welding point indicated at $w$. One terminal of a source of high frequency current is connected to a contact 14 which slidably engages the tube metal at or near one edge of the gap 13. A contact 15 is shown similarly engaging at the other edge of the gap. The other terminal of the high frequency source of current is shown as connected to a member 16. A conducting member 17 of hairpin-like configuration has one end as at 18 connected to the member 16 and its other end connected as at 19 to the contact 15. This hairpin-like member extends out along above the approaching tube gap edges in closely spaced relation thereto as indicated, and serves to conduct the current from the member 16 out along one gap edge and to the weld point and back along the other gap edge to the contact 15. This conducting member accordingly will conduct the high frequency current at any given instant in a direction such that it will induce in the opposed gap edges respectively currents in the opposite direction, viz. in the same direction on each gap edge as the current which flows in the metal of the tubing from one contact to the other. Thus the conductor 17 serves to enhance and concentrate the flow of current in the approaching gap edges.

As disclosed in said British patent, the contacts and all conductor parts carrying the high frequency current are preferably fluid-cooled and to that end cavities are provided in the members 14, 15, 16 for receiving streams of cooling fluid flowing in the direction indicated by the double arrows. The stream which flows through members 15 and 16 may also flow through the hairpin-like turn 17 which is in the form of a hollow tube.

The apparatus as thus far described in connection with the drawing is in accordance with that disclosed in the above-mentioned British patent, reference to which is hereby made as to further details of operation and possible modifications thereof. It will be understood that, if desired, the hairpin-like turn 17 may be omitted, in which case the terminals of the source of high frequency respectively would be connected directly to the contacts 14 and 15.

As further shown in the drawing, a "coil" 20, which may include one or more turns in the form of fluid-cooled tubing as indicated, extends from the contact 15 circumferentially around and in closely spaced relation to the tubing, including the "back" portions thereof opposite from the gap, and back to the contact 14. Such "coil" may be cooled by portions of the same cooling fluid streams which cool the contacts. That is, for example, the cooling fluid cavities may be so proportioned that a part of the cooling stream in contact 15 passes around through the tube 20 and into the cooling fluid stream in contact 14. It may be here noted that the cooling fluid stream may pass from member 16 through a tube of insulation material as at 21 into the contact 15, such insulation preventing short-circuiting of the hairpin-like turn 17.

The apparatus here shown in the drawing will operate in a manner similar to the operation of the equipment shown in said British patent, except that here a part of the current from contact 15 will flow around through the "coil" 20 back to the contact 14, this current flow being electrically in parallel with the current flow from the contacts along the gap edges to and from the weld point. The relative directions of the flow of the current at a given instant are indicated on several of the parts in the drawing by groups of three short arrows. Assuming for example as indicated, that at a given moment current is flowing down into member 16, it will continue through the member 17 outwardly around the weld point and back to the contact 15. Thence from contact 15, the current will be conducted in the tube metal at the gap edge out to the weld point and then back through the opposite gap edge to contact 14 in a manner described in said British patent. At the same time, some current will flow from contact 15 around through the member 20 in the direction indicated by the small arrows 23. The amount of this current may be adjusted or varied by designing the "coil" member 20 to have an appropriate resistance depending upon the desired proportion of the current which is to flow therethrough. It will be apparent that while the current is flowing in a downward direction as indicated by the short arrows at 23, it will cause a voltage to be induced in the metal of the tubing along a path extending circumferentially, as indicated by the longer arrow 24. This induced voltage, however, will be in opposition to the voltage which causes current to be conducted around through the back of the tubing from one contact to the other in the direction indicated by the dotted arrow 25. Thus the circumferential current path in the tubing will have its impedance increased by the presence of the coil 20, with the result that the greater portion of the radio frequency current used will be caused to be more concentrated to flow from the contacts along the gap edges to and from the weld point and less current will be wasted in heating the tube metal at other regions.

The invention is particularly well adapted for use in the welding of relatively small tubing or tubing having an internal diameter of small dimensions, wherein it would be difficult to mount means of other known types for increasing the reactance in the circumferential current path around the back of the tubing.

As will be noted in said British patent, the contacts, similar to those here shown at 14, 15, may alternatively be so mounted as to engage the edge faces in the tube gap 13, or even, if desired, the inner surfaces of the tube metal adjacent the gap.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for welding together the edges defining a longitudinal gap in metal tubing, such apparatus comprising: means for longitudinally advancing the tubing past means for applying pressure thereto to close said gap at a welding point; a pair of contacts mounted to engage the tubing respectively adjacent the gap edges and at positions shortly in advance of said welding point; means for applying a radio frequency current to said contacts whereby such current flows from the contacts along the gap edges to and from the welding point and the resistance heating effect of such current is concentrated in the approaching gap edges; and a conductor extending from one of said contacts circumferentially of the tubing in closely spaced relation to surfaces thereof around to the other of said contacts, whereby a portion of the radio frequency current will flow through said conductor and induce a voltage circumferentially in the tubing opposing the voltage which causes current to be conducted from one contact circumferentially of the tubing around to the other contact.

2. Apparatus for welding together the edges defining a longitudinal gap in metal tubing, such apparatus comprising: means for longitudinally advancing the tubing past means for applying pressure thereto to close said gap at a welding point; a pair of contacts mounted to engage the tubing respectively adjacent the gap edges and at positions shortly in advance of said welding point; means for applying a radio frequency current to said contacts whereby such current flows from the contacts along the gap edges to and from the welding point and the resistance heating effect of such current is concentrated in the approaching gap edges; and a conductor extending from one of said contacts circumferentially around outside the tubing in closely spaced relation to the surface thereof around to the other of said contacts, whereby a portion of the radio frequency current will flow through said conductor and induce a voltage circumferentially in the tubing opposing the voltage which causes current to be conducted from one contact circumferentially of the tubing around to the other contact.

References Cited in the file of this patent

UNITED STATES PATENTS

| 403,157 | Thomson | May 14, 1889 |
| 422,730 | Coffin | Mar. 4, 1890 |
| 2,020,276 | Crawford | Nov. 5, 1935 |
| 2,139,211 | Sessions | Dec. 6, 1938 |
| 2,468,796 | Wood et al. | May 3, 1949 |
| 2,599,229 | Bukaty | June 3, 1952 |
| 2,763,756 | Rudd et al. | Sept. 18, 1956 |

FOREIGN PATENTS

| 716,378 | Great Britain | Oct. 6, 1954 |
| 1,095,095 | France | Dec. 15, 1954 |